United States Patent

[11] 3,596,378

| [72] | Inventor | Charels H. Flubacker |
| | | Arlington Heights, Ill. |
| [21] | Appl. No. | 838,110 |
| [22] | Filed | July 1, 1969 |
| [45] | Patented | Aug. 3, 1971 |
| [73] | Assignee | Artag Plastics Corporation |
| | | Chicago, Ill. |

[54] AUTOMATIC TAPE MACHINE
13 Claims, 8 Drawing Figs.

[52] U.S. Cl. .................................................. 35/35 C,
179/100.1 VC, 179/100.2 MD
[51] Int. Cl. ............................................... G09b 5/04,
G11b 5/02
[50] Field of Search ........................................ 35/35 C;
179/100.1 VC, 100.2 S, 100.2 MD

[56] References Cited
UNITED STATES PATENTS
| 2,606,253 | 8/1952 | Somers .................. | 179/100.1 VC |
| 3,323,230 | 6/1967 | Cooper .................. | 35/35 C |
| 3,426,339 | 2/1969 | Rich et al. ............. | 35/35 C |
| 3,505,485 | 4/1970 | Andrews ............... | 179/100.1 VC X |

*Primary Examiner*—Wm. H. Grieb
*Attorney*—Hill, Sherman, Meroni, Gross & Simpson ABSTRACT: An automatic tape machine that may be used to teach foreign languages for example and in which a student may listen to a master tape, and then record on a student tap his pronunciation of the lesson and then listen to his recorded lesson before once again hearing the master tape.

The machine is designed and constructed such that it operates with a single talk-review lever wherein prior tape machines for teaching have required a number of switches and operations by the student to operate the machine.

A number of automatic features are provided including automatic cuing such that while the student is recording on the student tape the master tape backs up one sequence so that it will be prepared to repeat the master tape after the student has completed his recording.

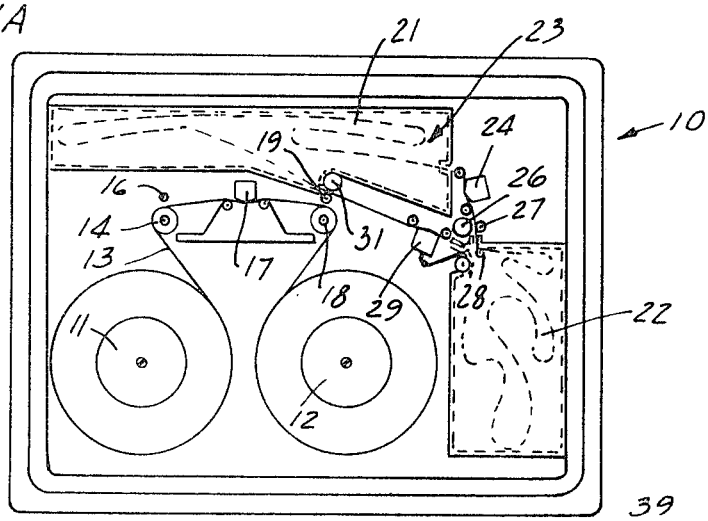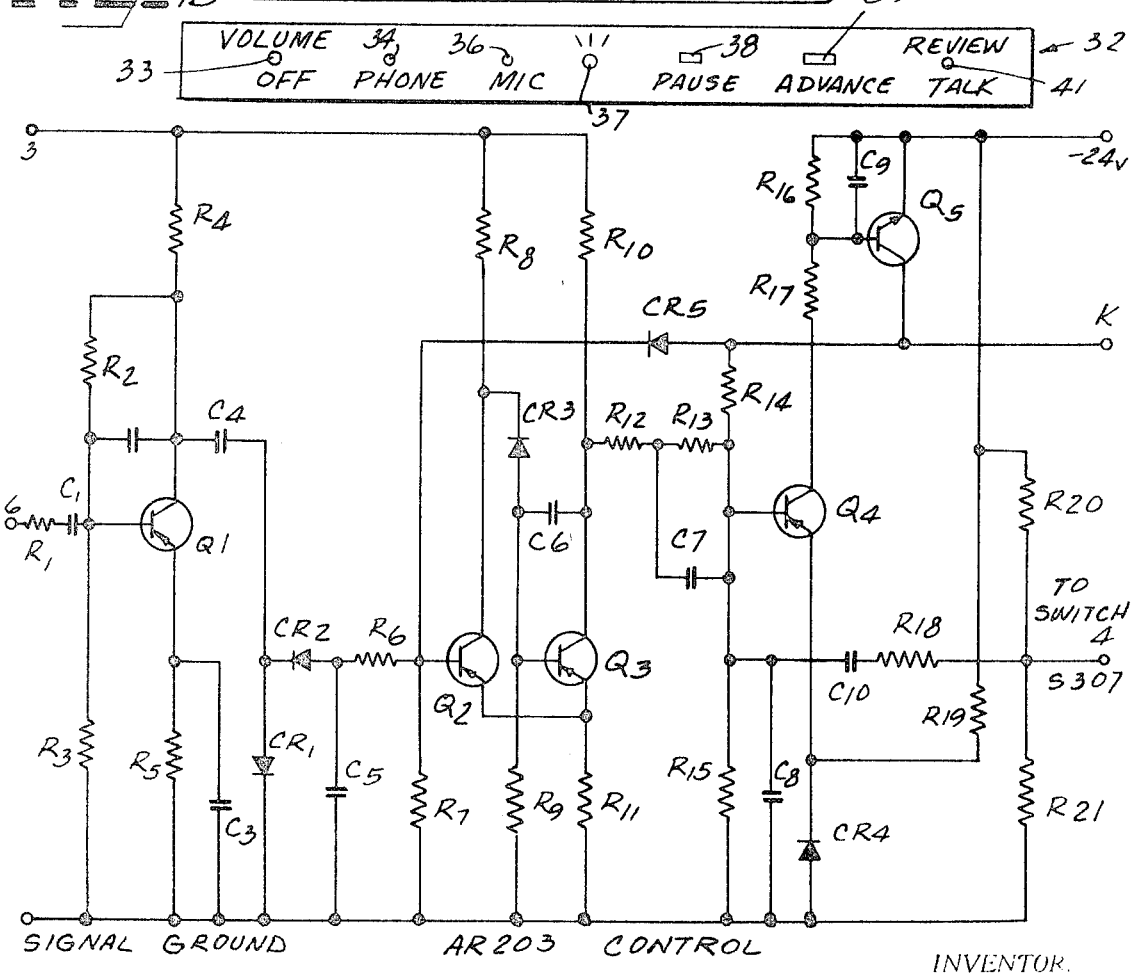

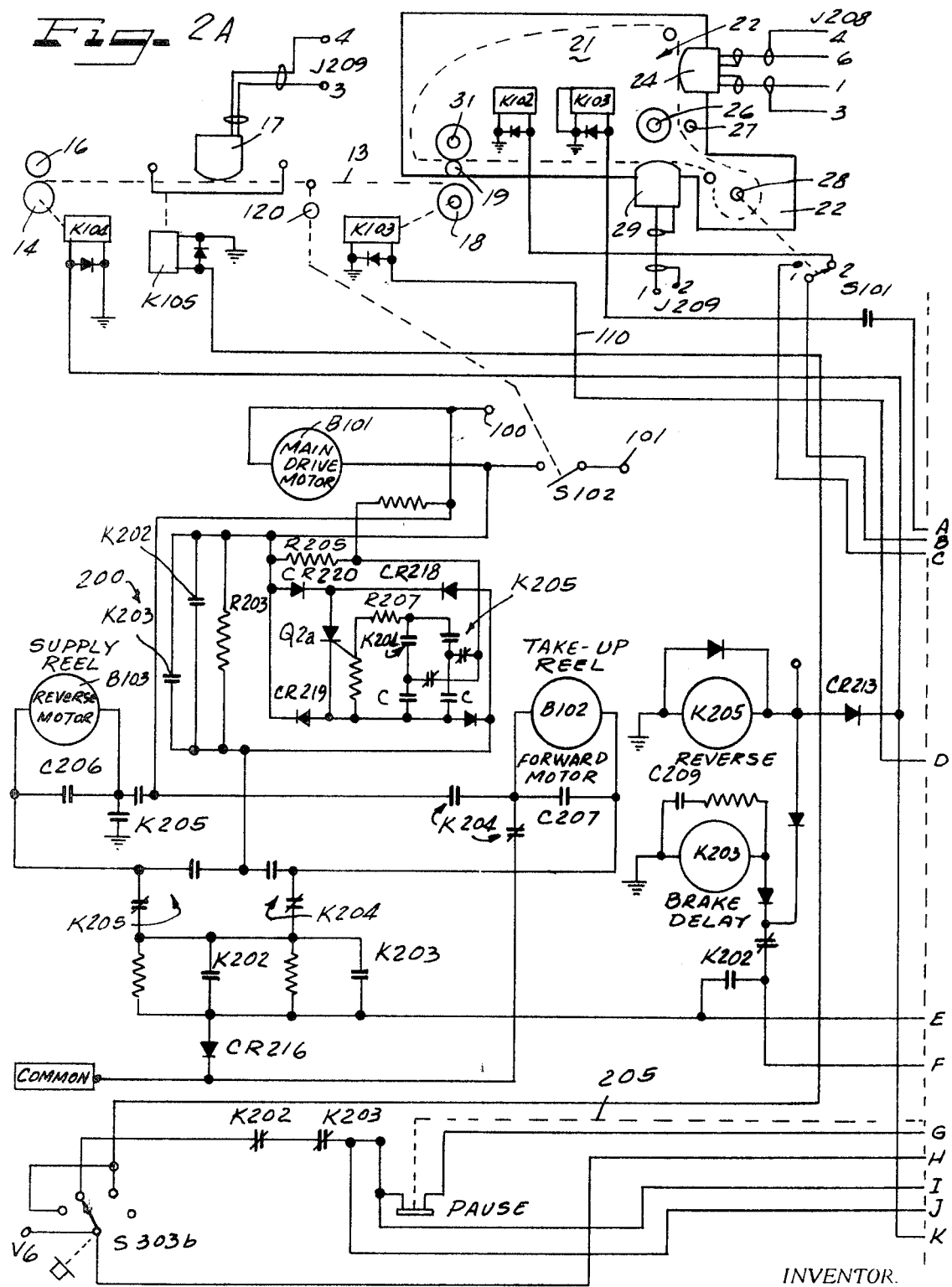

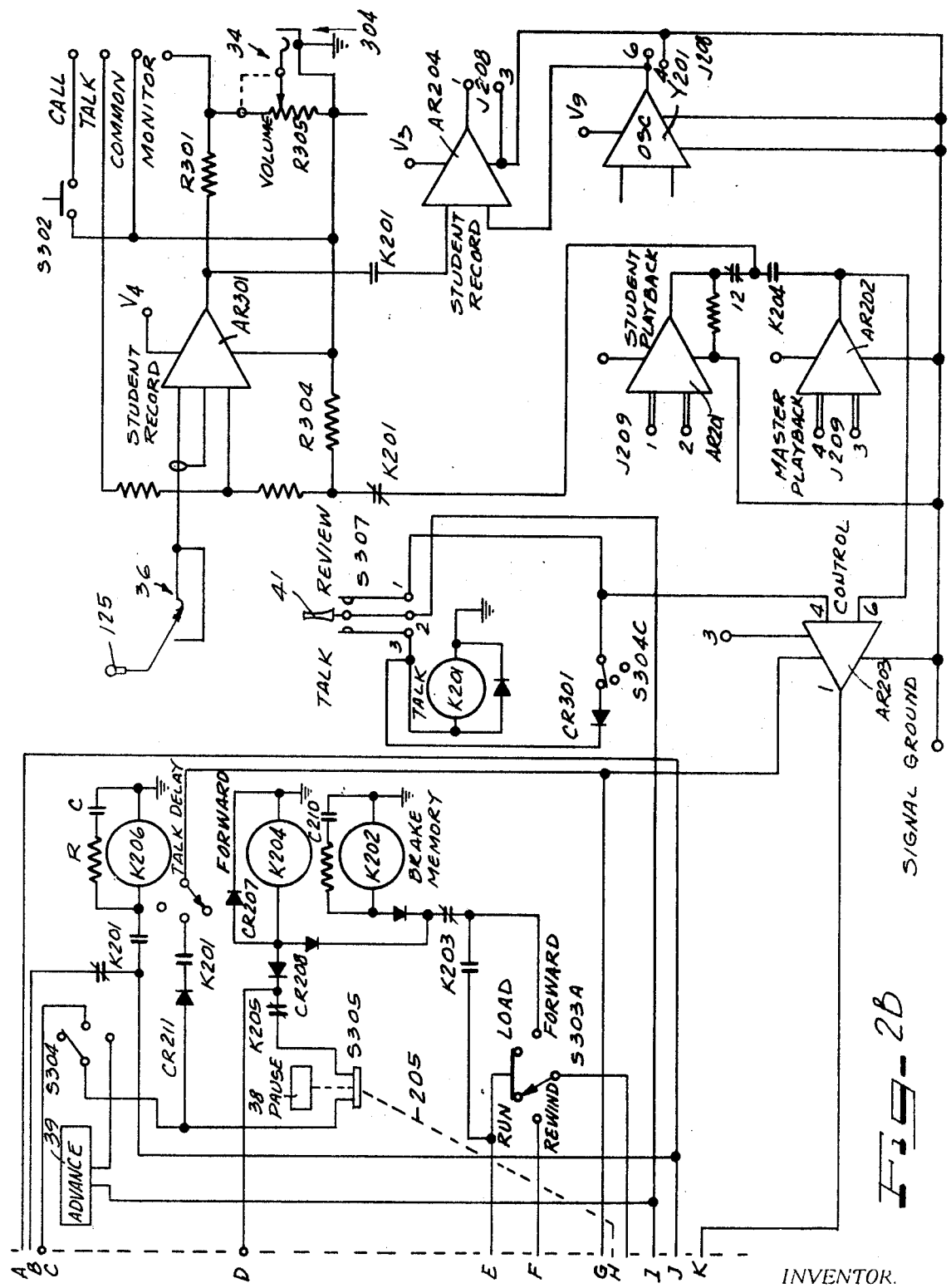

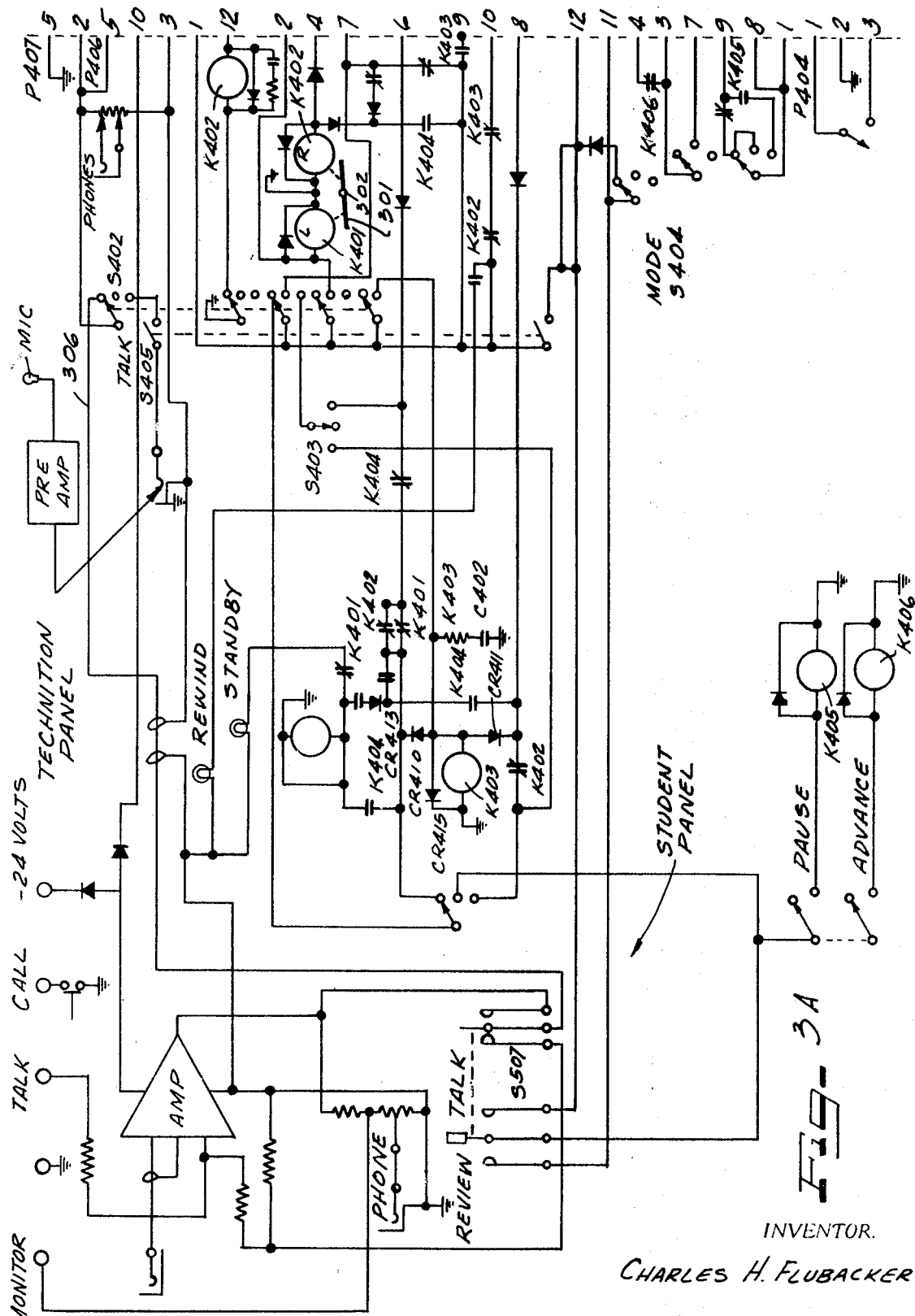

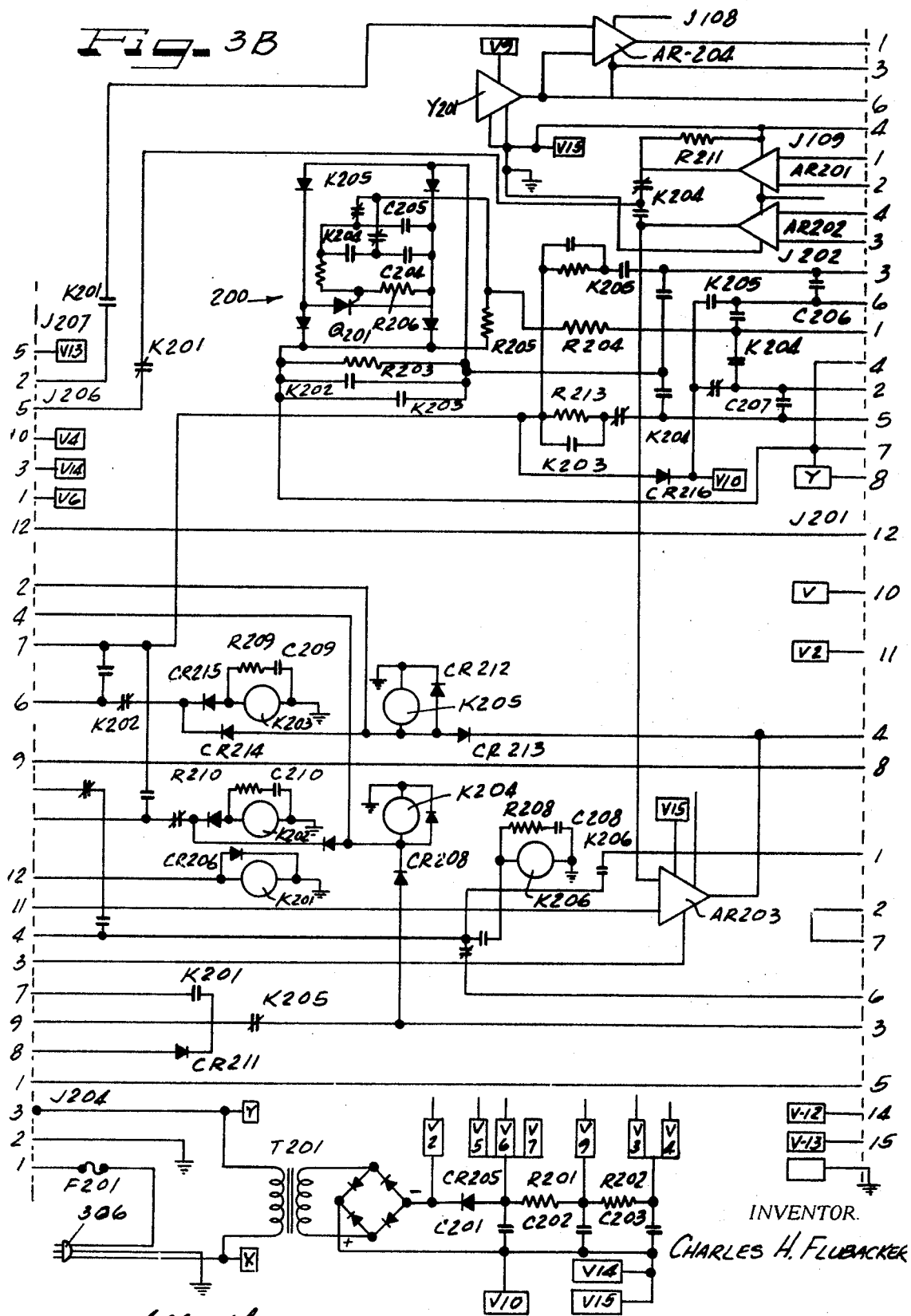

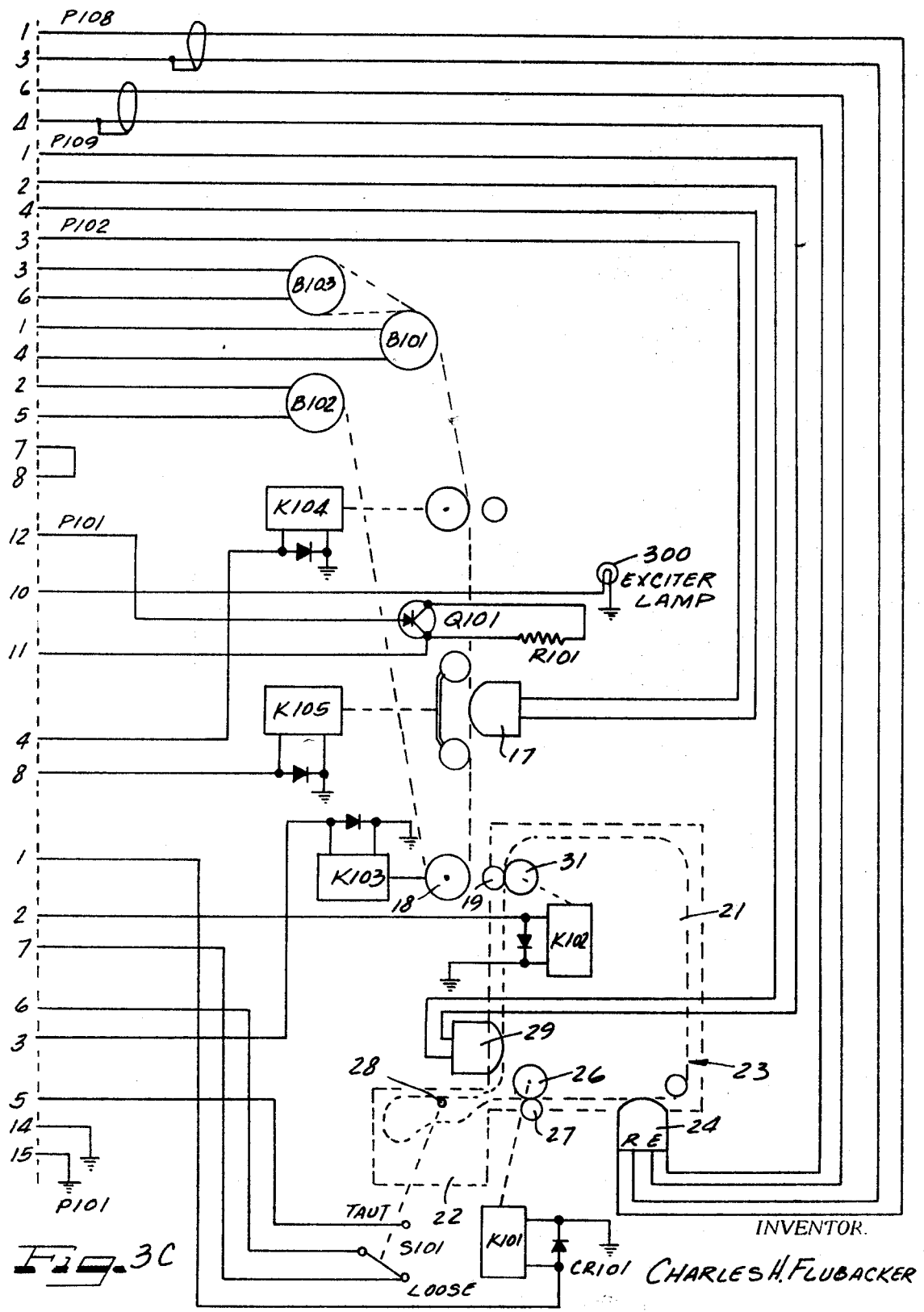

AUTOMATIC TAPE MACHINE

BACKGROUND OF THE INVENTION

1. Field of the Invention

This invention relates in general to automatic tape machines and in particular to an audiotutor that may be utilized to teach students foreign languages.

2. Description of the Prior Art

Teachers of contemporary foreign languages have generally agreed that for students to achieve conversational facility in a new language they must not only be given ample opportunity to hear that language spoken by a variety of native users, but also must practice speaking it themselves repeating each native-speech model until a recognizable close approximation of it is accomplished. This has required in the past working with a professional tutor of the language to be learned or enrolling in one or more of the better known modern language schools which have native-speaking instructors who individually teach the students. Such methods are very costly and phonograph records for use by the student were developed to allow a larger number of students to learn lessons. Class use of records was also made where the teacher simply played such records on a conventional table model phonograph and asked each member of the class group to repeat each speech model as it was played. Such systems, however, provided no means for monitoring by the teacher of the students pronunciation of the lesson or for the student to review his own attempts and compare it with the master lesson.

With the development of tape recorders a new teaching aid became available which greatly improved the teaching of foreign languages for example.

However, such machines have generally in the past required a large number of switching operations by the student to properly operate the tape machine. For example, the master tape is first played, then rewound for one lesson sequence, then the student records his attempt at speaking the lesson, then he will monitor his recorded lesson and finally will again listen to the master tape lesson. This sequence has required the student to learn complicated switching procedures so that his time and attention is partially taken with the mechanics of recording and reproducing, rewinding and playback rather than being totally directed toward the language learning process.

SUMMARY OF THE INVENTION

The present invention comprises an automatic tape machine for use in teaching languages, for example, wherein the sequence of operation has been reduced to a very simple procedure such that the student may listen to a master tape, record his attempt on a student tape, playback the reproduction on the student tape, and again listen to the master tape which has been rewound for one lesson sequence while he was recording on the student tape. All of these functions are accomplished with a single talk-review switch and the student need not learn complicated switching and operation techniques but may give his undivided attention to learning the language. The master tape is rewound for one lesson sequence while the student is recording with a circuit including an automatic cuing circuit which backs up until a single lesson sequence has been rewound. As soon as the student has completed his recording and has listened to it being played back, the master tape will again start to play again repeating the master lesson sequence and will continue to a second master lesson sequence unless the student wishes to again repeat the lesson.

Provisions are also made for control of the tape by a teacher or technician as well as by the student and the system has great flexibility, is simple and reliable.

Other objects, features and advantages of the invention will be readily apparent from the following description of certain preferred embodiments thereof taken in conjunction with the accompanying drawings, although variations and modifications may be effected without departing from the spirit and scope of the novel concepts of the disclosure in which:

BRIEF DESCRIPTION OF THE DRAWINGS

FIG. 1A is a top plan view of the automatic tape machine of this invention;

FIG. 1B shows the control panel of this invention;

FIGS. 2A and 2B are schematic views of the automatic tape machine of this invention;

FIGS. 3A, 3B, and 3C are schematic views of a modification of the invention; and FIG. 4 is a schematic view of the master playback cuing unit.

DESCRIPTION OF THE PREFERRED EMBODIMENTS

The automatic tape machine of this invention comprises a magnetic tape machine which reacts at the ability rate of the individual who operates it and it is particularly effective in the areas of foreign language and speech therapy. It allows the student to advance at his peak learning capability and has the choice of several operational modes to fulfill the needs for program learning. The machine frees an instructor so that he can devote more time to more pupils who need more attention. The machine may be readily used in conjunction with a console for monitoring and supervising and may be either desk or remote mounted. Each student may advance at his own rate based on his capabilities. Each student has his own master tape which he may monitor and play back as desired so each student may advance independently of all other students.

One of the most difficult tasks in learning to speak a foreign language is the dual challenge which requires the comprehension of new words or phrases and at the same time requires that the student memorize how to hold the lips, tongue, etc. to create the new word of phrase image. Each time a new word or phrase image is introduced, this challenge is presented anew. With prior equipment, it is impossible for the student to rehear the word or phrase if the program is being fed from a console or impractical even when the student may be working along with his own master tape due to the requirement for multiple switching operations and the resultant time loss. The present invention solves this problem by providing a single lever control which moved to a first position allows the item on the master tape to be reheard and this may be repeated by another touch of the master control until the student is satisfied.

After hearing the model from the master tape, the student exerts a slight pull pressure on the single control lever while recording his own impression on a student tape. When he releases the control lever, immediately his recorded effort is played back and immediately after that the original is replayed for comparison. The machine provides that while the student is recording and listening to the student tape that the master tape is rewound for one phrase so that it will be available to immediately start playing the master tape after the student has made his recording and listened to his recorded effort. The machine operates automatically and the student need operate only the single lever control.

The machine of this invention may also be operated by remote control so that one installation can serve multiple areas within a school plant for example. The student's recording on the student tape is erased when he records another lesson.

FIG. 1 illustrates the automatic tape machine of this invention and a control panel for controlling the machine. The tape machine 10 has a payout reel 11 and a takeup reel 12. Magnetic tape 13 passes from the payout reel over a first pinch roll 14 mounted adjacent a rewind capstan 16. A master tape playback head 17 is mounted adjacent the tape 13 and a second pinch roller 18 engages the tape and is moved to engage a capstan 19. A pair of student bays 21 and 22 are mounted on the tape machine 10 and include an endless student tape designated generally as 23. The student tape passes by an erase and record head 24 and a pinch roll 26 is movable to engage a student record capstan 27 to move the tape past the record head 24 and into the bay 22. A tension switch 28 is mounted in the bay 22. The tape 23 passes from the bay 22 by a playback head 29 in between a pinch roller 31 and the capstan 19. The tape machine has a control panel 32 which has an on and off switch 33 that may also control the volume, a phone plug 34, a mike plug 36, a rewind, run and load control 37, a pause button 38, an advance button 39 and a review-talk switch 41.

FIGS. 2A and 2B illustrate schematically the main drive motor B101 which is connected to the capstans 16, 19 and 27. The capstans 19 and 27 are driven by the main drive motor at 286 r.p.m. and the capstan 16 is driven by suitable gearing at 572 r.p.m. This allows quick rewind of the master tape.

The main drive motor is connected to suitable power terminals 100 and 101 through switch S102. 115v. AC is supplied from a suitable power supply to the terminals 100 and 101 so the main drive motor B101 drives at all times when the machine is in operation.

The forward motor B102 is connected to the takeup reel 12 to drive it when the master tape is being played. The reverse motor B103 is connected to the play out reel 11 to drive it when the master tape is being reversed. The master tape forward relay K103 is mechanically coupled to the pinch roll 18 to move it into engagement with the capstan 19 to move the master tape 13 forward. One side of the relay K103 is grounded and a diode CR103 is across the terminals of the relay K103. The relay K103 is connected to lead 110 which is connected to terminal D which is in turn connected to terminal D in FIG. 2B. Terminal D passes through normally closed contacts of relay K205 and through switch S305 controlled by a pause button 38 and through mode switch S304A to terminal C. Terminal C is connected to terminal 1 of switch S101 which is controlled by the taut feeler switch 28. When the student tape is taut, switch S101 will engage contact 1 which will complete a circuit to terminal B and from terminal B to terminal J of FIG. 2B and FIG. 2A. From terminal J of FIG. 2A the circuit will be completed through normally closed relay terminals of relays K202 and K203 to switch S303B to terminal 6 which applies power and thus energizes the master play relay K103.

The master tape will continue to play until the student moves the switch 41 to the talk or review position or until the master tape has reached its end. Then the master tape reaches its end, a feeler switch S102 will be opened by the linkage from the feeler 120.

If the student desires that the master tape be reversed to review it, he moves the switch 41 so that contact 2 of switch S307 engages contact 1 of switch 307 which applies suitable voltage as for example 24v. DC to contact 1 of switch S307 which is connected to terminal 4 of control AR203. Output 1 of control AR203 is connected to terminal K which is connected to terminal K of FIG. 2A to energize reverse relay K205 and reverse drive relay K104 which moves pinch roll 14 into engagement with capstan 16 to reverse the tape 13 of the master tape unit. It is to be noted that simultaneously reverse relay K205 contacts open the circuit to forward relay K103 between contact D and switch S305 as shown in FIG. 2B. This moves pinch roll 18 from engagement with capstan 19 so that the master tape 13 can reverse. Simultaneously the reverse relay 205 closes contact K205 connected to the reverse motor B103 so that it is energized to drive the play out reel 11. The brake delay relay K203 is also energized and applies a braking potential to the forward motor B102 to maintain tension on the tape 13 to allow rapid reversal of the tape.

The control AR203 shown in detail in FIG. 4 will be described in detail hereafter. However, the unit provides means for reversing the master tape for one master phrase at which time the relay holding voltage appearing at terminal 1 of the control AR203 disappears so that the reverse relay K205 and brake delay relay K203 are deenergized. It is to be realized that the switch 41 need only be momentarily closed to engage contacts 1 and 2 of switch S307 for the master tape to be reversed one phrase. As soon as the tape has reversed one phrase, the control AR203 will be energized to reverse relay K205 and brake delay relay K203 thus opening contacts K205 to the supply reel B103 reverse motor thus turning it off, deenergizing backup relay K104. When relay K204 is deenergized, the forward motor B102 is reenergized and relay K103 is energized thus causing the pinch roll 18 to engage capstan 19 to drive the master tape in the forward direction again until such time that the switch 41 is again moved.

The master head 17 connects to terminals 4 and 3 of J209 shown in FIG. 2A which are connected to master playback AR202 which provides an audio output through normally closed relay contacts K204 and K201 through resistor R304 to earphone terminals 304 into which the student plugs his earphones. The resistor R305 has a wiper contact which may be used as a volume control. It is to be realized, of course, that the master unit AR202 is an amplifier.

Thus, the student will hear the master tape picked up by head 17 until he moves the lever 41 to the review or talk position or the master tape reaches its end.

When the student desires to record on the student tape, the lever 41 is moved so that contact 2 engages contact 3 of switch S307. This applies 24 volts to relay K201. When this occurs, the master tape is reversed one phrase and stops and the student may record on the student tape and pinch roll 26 will engage the capstan 27 to move the tape from bin 21 into bin 22. As this occurs, the switch S101 will move to the loose position to engage contact 2. The student may record as long as the lever 41 holds the switch S307 so that contact 2 engages contact 3. When lever 41 is released so that switch S307 returns to its center spring biased position the student tape will be replayed by pinch roll 31 engaging capstan 19 to pull the student tape from bin 22 past the playback head 29 until the feeler 28 moves switch S101 to the taut position such that it engages contact 1. When this occurs, the master tape will again start to move in the forward direction until lever 41 which controls switch S307 is again moved.

Thus it is seen if the lever 41 is moved to the talk position such that contact 3 engages contact 2 the master tape is rewound for one phrase and the student may talk while the switch 41 is held in the talk position to move the tape 23 into bin 22. When the lever 41 is released, the pinch roll 31 engages capstan 19 to drive the student tape by head 29 which in connected to student playback amplifier AR201. The output of amplifier AR201 is supplied to the student earphones connected to plug 304. The student records by using microphone 125 which is plugged into plug 36 which receives power from terminal V4. The output of the student recording amplifier AR301 is connected to student record amplifier AR204 which is connected to plug J208 plugs 1 and 3 which supply the audiosignal to the record head 24. Oscillator Y201 provides an output to contacts 4 and 6 of plug J208 which are in turn connected to contacts J208 of record head 24 to provide a suitable magnetic erase signal to the erase record head 24 such that any old recording on the student tape will be erased before a new recording is made as it passes this head.

Circuit 200 illustrated in FIG. 2A comprises a "kick in the pants circuit" for assuring rapid reversal and smooth transition from forward to reverse. For example, 115 v. AC is applied to the forward motor B102 for fast forward. This is accomplished by energizing a relay K202 by moving switch S303A to the forward position. Relay K202 closes contacts in parallel with the resistor R203 in circuit 200 and 115 volts power will be applied to motor B102. During normal forward operation of motor B102, 115 v. AC is applied for 1 second and then 85 v. AC is applied to the forward motor B102. During back up, a drag voltage of 18 v. DC is applied to forward motor B102 to provide a drag and during the rewind 24 v. DC is applied to provide braking.

It is to be noted that the forward and reverse motors B102 and B103 must be smooth from rewind to fast forward. The motors must start, run, stop, and before going to a new phase, the old phase must be completed. The relay K203 holds brakes and capacitor 209 provides delay. RC networks are provided to give smooth stopping before the next phase of operation starts.

K204 is a forward relay K205 is a reverse relay.

FIG. 4 illustrates AR203 control. Input is applied at terminal 6 to resistor $R_1$ through a capacitor C1 to the transistor Q1 which serves as an amplifier. With reference to FIG. 2B, this is input 6 to control the unit AR203. The amplifier signal is applied from transistor Q1 through a voltage doubler to the rectifier comprising the diodes CR1 and CR2. A filter with a time constant comprising the capacitor C5 and the resistor R6 couples the signal to the base of a two-stage Schmidt trigger comprising the transistors Q2 and Q3. The output of the Schmidt trigger is supplied to a bistable flip-flop comprising the transistors Q4 and Q5 and the output is applied to terminal K which is illustrated in FIGS. 2A and 2B. A manual input from switch S307 is applied to resistor R18. The AR203 control is immune to input signals until a command is received at terminal 4 which will cause an output to be obtained from the control unit until the end of the first audiosequence is obtained which causes reversal and stopping of the master. When the circuit returns to a stable state of the Schmidt trigger, it turns off the bistable flip-flop comprising the transistors Q4, Q5 and the output at terminal K disappears.

The time constant of capacitor C5 and resistor R6 assures that a momentary pause in the audio as for example between words or syllables does not cause the output of the AR203 to disappear and the time constant might be approximately seven-tenths of a second, for example.

FIGS. 3A and 3B and 3C illustrate a modification of the invention where the tape machine includes a photocell Q101 as shown in FIG. 3C which detects the clear end of the tape at both ends. An excitor lamp 300 is energized when the tape machine is in operation and the photocell Q101 detects clear ends at both ends of the tape. The output of the photocell Q101 is connected through terminal 12 to relay K402 and latching relay K401 shown in FIG. 3A. The latching relay K401 has a left and right latching position and moves a pivoted bar 301 which is supported on a suitable pivot 302. The latching relay K401 has two inputs one from the photocell Q101 and the other to tell which way the tape was moving. This is accomplished by feedback from the forward and reverse motor relays.

The output of the latching relay functions to set differential brake to block the remote operator from going beyond clear leader and cuts off the circuit.

If the forward relay K204 was energized when clear tape appeared, it would set relay so as to block any additional power to that forward relay. At the end of the tape, a light comes on for rewind.

The apparatus of FIG. 3 includes a technician control station and when the technician reloads tapes and puts in clear tape leaders he does not have to advance the tape to dark tape. When the student takes control, the student rewind light comes on and when the rewind button is pushed by the student, the tape advances to dark tape and starts. The technician puts the unit in local control and at that time the student has no control. When in the remote position, the technician has no control and student has control. Thus, the technician can control the operation of the machine.

When the machine is in local, a teacher can talk through the audioportion to students during that time and the student may also call the teacher. The teacher can also talk while the student uses his machine and the student is suppose to put the machine into pause to stop the machine at that time.

Like elements in FIG. 3 correspond to similar numbered elements in FIG. 2. However, it is to be noted that in FIG. 3A the left portion including the review talk switch S507 is controlled by the student and the center portion of the schematic in FIG. 3A is the technician panel which has a talk switch S405 and a remote load and local switch S402. The switch is in the remote position as shown in the drawing so that the student has control of the unit. It is noted particularly that lead 306 leads through switch S402. The intermediate position of switch S402 is load and the lower position of switch S402 is for local control.

The schematic portion shown in FIG. 3B includes a "kick in the pants circuit" 200 and the lower portion includes a power supply including a plug 306 which is connected to a suitable transformer T201.

FIG. 3C illustrates the tape drive motors, capstan drive motors, tension switch S101 similar to the embodiment of FIG. 2 except that the photocell Q101 detects the clear tape on the machine.

The operation of the embodiment illustrated in FIGS. 3A through 3C is similar to that in FIG. 2 except that the technician panel may take control by placing switch S402 in the local position or the load position.

It is of interest to note that the reverse control of the main motor during the normal sequence of operation and capability for picking up a particular segment of the tape is controlled by the prerecorded material that is on the tape and not from any second track of coded material. The recorded audio on the master tape is used to control the reverse and repeat cycle.

It is seen that the invention provides a novel tape machine and although it has been described with respect to preferred embodiments it is not to be so limited as changes and modifications may be made therein which fall within the full intended scope as defined by the appended claims.

I claim:

1. A magnetic tape machine for teaching comprising a master tape upon which lessons are recorded, a student tape upon which a student may record his efforts, a master tape deck including a first magnetic head adjacent the master tape and having a supply reel and a takeup reel between which the master tape extends, means for driving said master tape in either direction past the first magnetic head, means for driving said takeup reel, means for driving said supply reel, a second magnetic head adjacent the student tape for recording thereon, a third magnetic head adjacent the student tape for reproducing, means for driving said student tape pass either the second or third magnetic heads, means for sensing when the recorded matter on the student tape has been completed, a control means with a single control connected to said means for driving said master and student tapes and to said sensing means, wherein said control means includes an automatic cuing circuit which detects the audiosignal from a single lesson as the master tape is reversed and which stops the master tape after the master tape has been reversed one lesson.

2 A magnetic tape machine according to claim 1 wherein said automatic cuing circuit comprises a master control having a trigger circuit which in a first condition causes said master tape to reverse and in a second position stops said master tape.

3. A magnetic tape machine according to claim 2 wherein said master control includes a bistable flip-flop circuit from which an output is removed for controlling said master tape, and input audiosignal from said mater tape coupled to said bistable flip-flop circuit.

4. A magnetic tape machine according to claim 3 comprising an integrating circuit connected between said input audio signal and said bistable flip-flop circuit.

5. A magnetic tape machine according to claim 4 comprising a Schmidt trigger circuit connected between said integrating circuit and said bistable flip-flop circuit.

6. A magnetic tape machine according to claim 5 wherein said integrating circuit has a time constant between the ranges of 0.5—1.5 seconds.

7. A magnetic tape machine according to claim 1 comprising photoelectric means for detecting when said master tape is clear at either end and signaling means connected to said photoelectric means to indicate when said master tape is clear.

8. A magnetic tape machine according to claim 7 comprising a two-position latching relay which receives an input from photoelectric means and a second input indicative of the direction of movement of said master tape.

9. A magnetic tape machine according to claim 8 comprising means for disabling the means for driving the takeup and supply reels when clear tape is detected by said photoelectric means.

10. A magnetic tape machine according to claim 1 comprising a student control station and a monitor control station and with the monitor control station including means for overriding said student control station.

11. A magnetic tape machine for teaching comprising a master tape upon which lessons are recorded, a student tape upon which a student may record his efforts, a master tape deck including a first magnetic head adjacent the master tape and having a supply reel and a takeup reel between which the master tape extends, means for driving said master tape in either direction past the first magnetic head, means for driving said takeup reel, means for driving said supply reel, a second magnetic head adjacent the student tape for recording thereon, a third magnetic head adjacent the student tape for reproducing, means for driving said student tape pass either the second or third magnetic heads, means for sensing when the recorded matter on the student tape has been completed, a control means with a single control connected to said means for driving said master and student tapes and to said sensing means and wherein said control means includes a power control circuit for the means for driving the takeup reel and the supply reel wherein the supply reel is driven faster than normal forward during fast forward and during reversal of the master tape.

12. A magnetic tape machine according to claim 11 wherein said power control circuit applies braking and drag voltages to the means for driving the takeup reel and the supply reel.

13. A magnetic tape machine according to claim 12 wherein said power control circuit includes a voltage dropping resistor means and means for shorting said voltage dropping resistor.